United States Patent
Di Cesare et al.

(10) Patent No.: US 6,773,796 B1
(45) Date of Patent: Aug. 10, 2004

(54) THERMOFORMABLE MULTI-LAYER POLYPROPYLENE FOAM SHEET

(75) Inventors: Gregorio Di Cesare, Cerro Maggiore (IT); Renato Angelo Colnaghi, Pogliano Milanese (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/806,812

(22) PCT Filed: Apr. 10, 1999

(86) PCT No.: PCT/EP99/07338

§ 371 (c)(1),
(2), (4) Date: Jul. 2, 2001

(87) PCT Pub. No.: WO00/23270

PCT Pub. Date: Apr. 27, 2000

(30) Foreign Application Priority Data

Oct. 19, 1998 (EP) .............................. 98119685

(51) Int. Cl.[7] .............................................. B32B 3/26
(52) U.S. Cl. ................ 428/316.6; 428/319.3; 428/319.7; 428/319.9; 428/317.1; 428/317.7; 428/318.4
(58) Field of Search ........................... 428/318.4, 318.6, 428/319.3, 319.7, 319.9, 317.1, 317.7, 316.6

(56) References Cited

U.S. PATENT DOCUMENTS

| | | | |
|---|---|---|---|
| 4,721,643 A | * 1/1988 | Harayama et al. | ............ 428/90 |
| 4,851,286 A | * 7/1989 | Maurice | ................... 428/316.6 |
| 4,889,669 A | 12/1989 | Suzuki | ...................... 264/45.9 |
| 5,116,881 A | 5/1992 | Park et al. | ................... 521/143 |
| 5,180,751 A | * 1/1993 | Park et al. | ..................... 521/51 |
| 5,928,776 A | 7/1999 | Shioya et al. | ............. 428/316.6 |
| 6,194,042 B1 | * 2/2001 | Finkelstein et al. | ......... 215/348 |

FOREIGN PATENT DOCUMENTS

| | | |
|---|---|---|
| GB | 2 263 435 A | 7/1993 |
| JP | 7060816 | 7/1995 |

OTHER PUBLICATIONS

Translation of JP 07–060816, Mar. 7, 1995, Yanmauchi Kenichi, 6 pages.*

* cited by examiner

Primary Examiner—Terrel Morris
Assistant Examiner—Hai Vo
(74) Attorney, Agent, or Firm—Thomas C. Lagaly

(57) ABSTRACT

A thermoformable, multilayer, co-extruded sheet comprising at least two separate foam polypropylene layers obtained by chemical foaming of two polyproplene resins having different flexural modulus, a "high modulus" polypropylene and a "low modulus" polypropylene. The presence of two different foam layers of polypropylene of different modulus allows obtaining a thermoformable sheet with the desired balance between thermoformability and stiffness.

9 Claims, No Drawings

THERMOFORMABLE MULTI-LAYER POLYPROPYLENE FOAM SHEET

The present invention relates to a multi-layer, cros-extruded, thermoformable sheet suitable for the production of packaging material.

In particular the present invention relates to a co-extruded, rigid or semi-rigid, sheet comprising at least two polypropylene foam layers, said sheet being thermoformable into shaped articles for packaging.

Thermoforming is a common method for forming trays to be used in the packaging art for holding the products to be packaged. In some cases pre-formed trays are fed to a filling machine which inserts or lays the product to be packaged onto the tray and then either seals on a lid or wrap the loaded tray up. In most of the cases, particularly in the packaging of food products, e.g. fresh red meat or processed meat, a horizontal thermoform-fill-seal machine is employed. Said machine typically requires two separate webs of material, a lower or bottom web and an upper or top web. The lower web must be designed to be easily thermoformable as the machine creates a more-or-less shallow tray therefrom by pulling it across a heated cavity, or die, into which the sheet is drawn by vacuum at temperatures high enough to soften the sheet and allow it to adopt the shape of the cavity without tearing or cracking.

The sheet employed for this purpose therefore must have a good balance between thermoformability, as the speed of the thermoform-fill-seal machine is limited by the time required in the thermoforming step and the appearance of the end package will mainly depend on that of the supporting tray, and stiffness, as the tray should not bend during the packaging process or be distorted by the weight of the packaged product.

In some instances, when a lid is sealed to the tray or the tray rim, the lower web must also be heat-sealable. In some cases it is also required that said thermoformable sheet has a low permeability to gases, in particular oxygen, in order to prolong the shelf-life of oxygen susceptible products, e.g. most food products.

Other packaging machines, where an in-line thermoformable lower web is required, are those employed for skin packaging. In these machines the lower web is thermoformed into a tray, the product to be package loaded thereon and the upper web is drawn down by vacuum all around the product until the film conforms so faithfully to the product contours that it becomes like a skin. Also in this case a thermoformable sheet with a good balance between thermoformability and stiffness is required that preferably has gas barrier properties.

Cast solid sheets are typically employed for these applications. In some cases also foamed sheets are used, as the appearance of a foamed material is well appreciated in the market. One of the problems met with the foamed sheets is to obtain the desired balance between thermoformability and stiffness.

It is an object of the present invention to provide a rigid or semi-rigid foam sheet material that can suitably be thermoformed into a shaped container, such as a tray.

Another object of the present invention is to provide a thermoformable, multi-layer, co-extruded, polypropylene foam sheet having a density ranging from about 0.50 to about 0.85 g/cm$^3$ and a flexural modulus higher than 400 MPa.

A still another object of the present invention is to provide a thermoformable foam sheet material co-extruded with a gas barrier layer for all those applications where a gas barrier packaging material is desired.

It has been found that the above objectives can be achieved by a multi-layer, co-extruded, sheet of thermoplastic material comprising at least two separate layers of foamed polypropylene obtained by chemically foaming polypropylene resins with different flexural modulus.

Polypropylene foam sheets comprising two different layers of foam polypropylene are described in WO 91/13933. More particularly said patent application describes polypropylene foam sheets obtained by physical foaming of a polypropylene resin with certain specific characteristics in terms of $M_2$, $M_2/M_W$ ratio, $J_{e0}$ (equilibrium compliance) and/or $S_1/S$ (recoverable shear strain per unit stress). The process there described is a physical process, i.e. a process where foaming is obtained by the use of a blowing agent such as a hydrocarbon, e.g. butane and isopentane, a chlorinated or chloro-fluorinated hydrocarbon, e.g. chlorodifluoromethane, or an inert gas such as nitrogen or carbon dioxide. Generally, however, the use of a hydrocarbon either or a blend of a hydrocarbon with an inert gas obtains physical foaming. This creates problems of safety during the manufacturing process as well as during stocking of the foamed material. It is in fact necessary to age the foamed material in the warehouses until the trapped blowing gas is evolved and has been replaced by air. Forced ventilation of the warehouses is required and, depending also on the type of blowing agent employed, 5 to 7 days of aging are necessary before the foamed product can be distributed to customers.

WO 91/13933 also refers to the manufacture of a multi-layer foam sheet comprising a functional layer sandwiched between two polypropylene foam layers, possibly with tie layers bonding the foam polypropylene layer to the functional one. The process there schematically described provides for a co-extrusion where the same polypropylene material is foam extruded into two different layers and the foaming is always a physical foaming, with the drawbacks indicated above.

DETAILED DESCRIPTION OF THE INVENTION

A first object of the present invention is a thermoformable, multi-layer, co-extruded sheet comprising at least two separate foam polypropylene layers obtained by chemical foaming of two different polypropylene resins having different flexural modulus, a "high modulus" polypropylene and a "low modulus" polypropylene.

The flexural modulus of the "low modulus" polypropylene resin must be lower than 1,500 MPa, preferably ≦1,400 MPa, and even more preferably ≦1,300 MPa. Examples of "low modulus" polypropylene resins are for instance those commercially available from Montell as Polypropylene KF 6100 (Flexural Modulus, evaluated by ISO Standard Method 178, of about 1,300 MPa) and Polypropylene YX37F (Flexural Modulus of about 1,200 MPa).

The flexural modulus of the "high modulus" polypropylene resin must be ≧1,500 MPa. Preferably it will be ≧1,650 MPa, and even more preferably ≧1,800 MPa. Examples of "high modulus" polypropylene resins are those commercially available from Montell as Adstif™ 680 ADXP (Flexural Modulus of 2,150 MPa) and Adstif™ 699 ADXP (Flexural Modulus of 1,950 MPa).

In the multi-layer co-extruded sheet of the present invention the two foam polypropylene layers are separated by at least one substantially unfoamed layer Any thermoplastic material or blend of thermoplastic materials can suitably be employed for said substantially unfoamed layer. The term "substantially unfoamed" is used herein to identify a layer that has not been submitted to a chemical foaming, i.e. that has not been admixed with a chemical foaming agent before extrusion. This term does not exclude, in particular for those layers that are directly adhered to the foam polypropylene layers, that the evolution of gas in the adjacent layers might give raise to a certain, non-substantial, foaming also in these layers.

In case the material or blend of materials used for said layer would not adhere to the foam polypropylene layers with a sufficient bond, tie or adhesive layers may be employed to increase said bond and prevent possible delamination problems.

In one preferred embodiment of the present invention recycle material is incorporated into said substantially unfoamed layer to give additional bulk to the sheet.

In a more preferred embodiment however said substantially unfoamed layer is a gas barrier layer, i.e. a layer of a suitably selected polymeric material and of the suitably selected thickness to provide for an overall multi-layer sheet with an oxygen permeability lower than 200 $cm^3$/$m^2$.day.atm, preferably lower than 150 $cm^3$/$m^2$.day.atm, more preferably lower than 125 $cm^3$/$m^2$.day.atm, and even more preferably lower than 100 $cm^3$/$m^2$.day.atm.

Suitable resins for use in said functional layer are preferably ethylene-vinyl alcohol copolymers (EVOH), vinylidene chloride copolymers (PVDC), polyamides, and blends of one or more EVOH with one or more polyamides.

As used herein, "EVOH" refers to ethylene-vinyl alcohol copolymers. EVOH includes saponified or hydrolyzed ethylene-vinyl acetate copolymers, and refers to vinyl alcohol copolymers having an ethylene comonomer content preferably comprised from about 28 to about 48 mole %, more preferably, from about 32 to about 44 mole % ethylene, and even more preferably, from about 38 to about 44 mole % ethylene, and a saponification degree of at least 85%, preferably at least 90%.

As used herein the term PVDC refers to a vinylidene chloride copolymer wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) or to a blend thereof in different proportions. Generally said PVDC contains plasticisers and/or stabilisers as known in the art.

As used herein, the term polyamide is intended to refer to both polyamides and co-or ter-polyamides. This term specifically includes aliphatic polyamides or co-polyamides, aromatic polyamides or co-polyamides, and partially aromatic polyamides or co-polyamides, modifications thereof and blends thereof.

In case one of the above gas barrier materials is employed for the substantially unfoamed layer, tie layers will be present to increase the bond between said layer and the foam polypropylene ones. Suitable tie layers will preferably comprise modified polyolefins, and more preferably modified polypropylene, modified polyethylene, and modified ethylene co-polymers, such as modified ethylene-α-olefin copolymers, and modified ethylene-unsaturated ester copolymers, e.g. modified ethylene-vinyl acetate copolymers.

As used herein the term "modified", when referred to any polyolefin, is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like; or by incorporating into the olefin homopolymer or copolymer, an unsaturated carboxylic acid, e.g., maleic acid, fumaric acid or the like, or a derivative thereof such as the anhydride, ester or metal salt or the like. Examples of suitable modified polyolefins are in particular polymers having an anhydride functionality, as defined above, grafted thereon and/or copolymerized therewith and/or blended therewith, wherein preferably, such modified polymers have the anhydride functionality grafted on or polymerized therewith, as opposed to merely blended therewith.

In a preferred embodiment the present invention relates to a thermoformable, multi-layer, co-extruded sheet comprising at least two separate foam polypropylene layers obtained by chemical foaming of two polypropylene resins having different flexural modulus, a "high modulus" polypropylene and a "low modulus" polypropylene, sandwiching a gas barrier layer comprising a polymer selected from the group consisting of ethylene-vinyl alcohol copolymers (EVOH), vinylidene chloride copolymers (PVDC), polyamides, and blends of one or more EVOH and one or more polyamides, bonded to said foam polypropylene layers by means of tie layers.

The thickness of the overall thermoformable sheet of the present invention is typically comprised between about 400 and about 1,300 μm. For most of the conventional applications a preferred thickness is in the range of from about 500 to about 1,000 μm, with a most preferred thickness in the range of from about 600 to about 900 μm.

The thickness of each of the foamed polypropylene layers may range from about 100 to about 700 μm, and is preferably comprised between about 150 and about 550 μm, more preferably between about 200 and about 400 μm. Generally the optimum thickness of the "low modulus" and of the "high modulus" polypropylene layers and their ratio depends on the numerical values thereof and could be easily determined, by trial and error, bearing in mind that the flexural modulus of the end multi-layer sheet should be higher than 400 MPa, preferably higher than 500 MPa, and even more preferably higher than 600 MPa.

When the substantially unfoamed layer separating the two polypropylene foam layers is not a functional layer, its thickness is not critical. Layers as thin as few μm's or as thick as 250, 300, 350, or more μm can be present.

When the substantially unfoamed layer is a functional layer, its thickness is generally controlled and comprised between about 5 and about 50 μm, preferably between about 6 and about 40 μm, and even more preferably between about 7 and about 30 μm. The thickness of said functional layer should in fact be high enough to guarantee the desired maximum oxygen permeability of the end sheet, but, mainly in view of the cost of the raw polymers, should not be considerably higher than that.

The thickness of the tie layers, as usual, will be limited to few μm's i.e. what is generally needed to provide for the desired bond. As foaming does modify the polymer surface at the interface with the adjacent layers, it is generally required a slightly higher thickness of the tie layers with respect to the corresponding unfoamed structure, e.g. typically up to about 20 μm.

Even when an end sheet is obtained wherein the two foamed polypropylene layers are both outer layers, the structure is not symmetrical owing to the different modulus of the two polypropylene layers. Thermoforming of this structure needs to be carried out in such a way that the "low modulus" polypropylene layer is the layer in contact with the die cavity and the "high modulus" polypropylene layer is the upper layer in direct contact with the product to be packaged.

When the thermoformable sheet according to the present invention is used in a packaging process that comprises sealing of an upper web or lid to the tray surface, it would be highly desirable to have a heat-sealing layer adhered on the outer surface of the foamed "high modulus" polypropylene layer.

As used herein the term "adhered", as applied to sheet layers, includes both direct adherence of the subject layer to the other layer referred to or to the other two layers the subject layer is between, as well as a lack of direct adherence, i.e., one or more additional layers can be imposed between the subject layer and the other layer referred to or between the subject layer and one or both of the layers the subject layer is between.

Such a heat-sealing layer would be a layer of a substantially unfoamed, heat-sealable resin or blend of resins, and will provide for an improved heat-sealability of the overall structure.

Said heat-sealing layer will be the upper layer in the end sheet, i.e. the layer that in the tray will be supporting the product to be packaged and will be in direct contact therewith.

Suitable heat-sealing polymers preferably have a melting point <140° C.; and preferably <130° C. Such a heat-sealing layer will typically comprise polyethylene homopolymers; heterogeneous or homogeneous ethylene-($C_4$–$C_8$)-α-olefin copolymers having a density $\leq 0.915$ g/cm$^3$; blends thereof with minor amount of polyethylene homopolymers; ethylene-vinyl acetate copolymers; ethylene-acrylic or methacrylic acid copolymers including ionomers; heterogeneous or homogeneous ethylene-($C_4$–$C_8$)-α-olefin copolymers having a density from about 0.915 g/cm$^3$ to about 0.930 g/cm$^3$; blends thereof with ethylene-vinyl acetate copolymers or ethylene-alkyl (meth)acrylate copolymers; ethylene-propylene-butene ter-polymers; ethylene-alkyl acrylate-maleic anhydride ter-polymers; and the like polymers.

If necessary or desirable, a tie layer will be present to bond the heat-sealing layer to the polypropylene foam one.

In a preferred embodiment of the present invention the thermoformable, multi-layer, co-extruded sheet may also comprise an easy opening feature.

As an example, the heat-sealing layer of the thermoformable sheet may comprise a so-called "peelable" blend. When the thermoformed bottom web, bearing said peelable blend in the upper heat-sealing layer, is sealed to a suitably selected top web, easy opening of the end package is then obtained by separating the two webs at the seal interface by a peeling mechanism.

Alternatively a thin heat-sealing layer may be adhered directly to the foamed polypropylene or to a layer of a polymer with which it has a low bond. In this case the easy opening of the package is obtained by first breaking through the thickness of the thin heat-sealing layer and then delaminating said heat-sealing layer from the underlying support or film.

Still alternatively the easy opening feature is provided by the use of a layer of a blend of only partially compatible polymers having a low internal cohesion. Said low cohesion layer may possibly be coated with a thin heat-sealing layer. Opening of the package in such a case is achieved by internal rupture of the low cohesion layer (and if present of the thin heat-sealing layer first). Examples of blends useful in this alternative easy opening system are described for instance in EP-B-192,131.

It is not necessary that at least one of the outer layers of the thermoformable sheet of the present invention be a layer of "low modulus" foamed polypropylene. It is in fact also possible to coat said polypropylene layer, still by a co-extrusion process, with one or more layers of a thermoplastic foamed or solid material or blend of materials. Said additional layer(s) may be useful for instance to improve the appearance or the properties of the thermoformable sheet, e.g. providing a paper-like appearance or a colored/metallised appearance or providing the thermoformable sheet with UV absorbing properties, antistatic properties, or slip properties. As the "low modulus" foamed polypropylene layer is always closer to the die cavity than the "high modulus" one, the material that will be present in the outer layer adhered to said "low modulus" foamed polypropylene layer should be selected in such a way to withstand direct contact with the heated cavity die during thermoforming.

One of the advantages of the thermoformable sheet according to the present invention is that it can be obtained by co-extrusion, using a flat die. The use of a flat die and of the flat sheet technology, providing for the calendering of the flat multilayer sheet following extrusion and quenching, allows a better thickness control of the end sheet. An annular die, as required in the physical foaming processes, could however be employed also in this case.

Chemical foaming of the propylene layers is obtained by extruding the resins admixed with the suitable amount of a chemical blowing agent, preferably an endothermic chemical blowing agent.

A chemical foaming agent is a chemical or compound that reacts or decomposes at elevated temperatures, such as those employed in extrusion, to give a product that is normally a gas at atmospheric pressure. The most common chemical foaming agent is sodium bicarbonate with a small amount of citric or tartaric acid as a co-agent. These agents are typically in dry powder form and are dusted or master-batched into the thermoplastic pellets prior to introduction into the extrusion equipment. Proprietary alkali carbonate mixtures suitable as chemical foam agents are those commercialised by Boehringer Ingelheim under the trade name Hydrocerol™ or by Hoechst Celanese under the trade name Hostatron™. Generally these products are sold in the form of master-batches containing about 40% of foaming agent and said master-batches are added to the polypropylene pellets in an amount typically comprised between about 0.2 and about 3.0% by weight, preferably between about 0.5 and about 2% by weight. In the co-extrusion process for the manufacture of the thermoformable sheet according to the present invention, the two polypropylene resins need not to contain the same foaming agent or the same amount of foaming agent. Typically the amount of foaming master-batch in a core polypropylene layer will be comprised between about 0.5 and about 1.5% by weight, while it will be comprised between about 1 and about 2.5% by weight if the foamed polypropylene layer is an outer layer.

The invention may be further understood by reference to the following examples that are provided for the purpose of representation and are not to be construed as limiting the scope of the invention. Unless stated otherwise, all percentages, parts, etc. are by weight.

EXAMPLE 1

The following resins have been co-extruded through a flat die in the sequence reported below. The layer number 1. is the sheet layer that in the thermoforming process is in contact with the heated cavity die. The thickness of each layer in the end partially foamed sheet is also reported between parentheses:

1. Low flexural modulus polypropylene (Montell YX37F sold by Montell—flexural modulus of about 1,200 MPa) blended with 2% by weight of Hydrocerol™ CF 40 E (350 μm);

2. Modified ethylene-vinyl acetate copolymer (Orevac™ 18211 sold by Elf Atochem) (15 μm);

3. Ethylene-vinyl alcohol copolymer (EVALC F-101 BZ sold by Kuraray) (21 μm);

4. Modified ethylene-vinyl acetate copolymer (Orevac™ 18211 sold by Elf Atochem) (15μm);

5. High flexural modulus polypropylene (Adstif™ 699 ADXP sold by Montell—flexural modulus of about 1950 MPa) blended with 1% by weight of Hydrocerol™ CF 40 E (260 μm);

6. Modified ethylene-vinyl acetate copolymer (Orevac™ 18211 sold by Elf Atochem) (20 μm);

7. Blend of 66% by weight of ionomer (Surlyn™ 1601 sold by DuPont), 24% by weight of modified ethylene-vinyl acetate copolymer (Elvaloy™ 741A sold by DuPont), and 10% of polybutene (Polybutene 8640 sold by Shell) (12 μm);

8. Ethylene-vinyl acetate copolymer (Escorene™ UL00909 sold by Exxon) (7 μm).

The co-extruded sheet has been quenched on a chill roll and calendered.

Flexural modulus of the end sheet was about 850 MPa in MD (machine direction) and about 750 MPa in TD (transverse direction).

The density of the end sheet was about 0.7 g/cm³.

Oxygen permeability of the obtained structure was about 1-2 cm³/m².day.atm, when measured at 23° C. and 0% R.H. according to ASTM D3985.

The thermoformability in-line of the obtained sheet was tested on a Multivac CD 6000 machine for Vacuum Skin Packaging. The thermoforming conditions were as follows:
forming temperature: 150° C. (with sandwich plate)
forming pressure: 2.5 bar
hearing time: 5 seconds
forming depth: 5 mm, 20 mm, and 27 mm.

In all the three depths tested the results were very good and both corners and grooves were very well defined with no creases or cracks.

What is claimed is:

1. A thermoformable, multilayer, co-extruded sheet comprising at least two separate foam polypropylene layers obtained by chemical foaming of two polypropylene resins having different flexural modulus, wherein at least one substantially unfoamed layer is positioned between the two foam polypropylene layers, said substantially unfoamed layer comprising a gas barrier.

2. The thermoformable sheet of claim 1 wherein one of the two polypropylene resins is a "low modulus" polypropylene resin having a flexural modulus lower than 1,500 MPa.

3. The thermoformable sheet of claim 1 wherein one of the two polypropylene resins is a "high modulus" polypropylene resin having a flexural modulus $\geq 1,500$ MPa.

4. The thermoformable sheet of claim 3, further comprising a heat-sealing layer adhered to an outer surface of the "high modulus" polypropylene foamed layer, said heat-sealing layer comprising one or more polymers having a melting point <140° C.

5. The thermoformable multi-layer sheet of claim 4 wherein the heat-sealing layer comprises a polymer selected from the group consisting of polyethylene homopolymers; heterogeneous or homogeneous ethylene-($C_4$–$C_8$)-alpha-olefin copolymers having a density $\leq 0.915$ g/cm³; blends thereof with minor amount of polyethylene homopolymers; ethylene-vinyl acetate copolymers, ethylene-acrylic or methacrylic acid copolymers including ionomers; heterogeneous or homogeneous ethylene-($C_4$–$C_8$)-alpha-olefin copolymers having a density from about 0.915 g/cm³ to about 0.930 g/cm³; blends thereof with ethylene-vinyl acetate copolymers or ethylene-alkyl(met)acrylate copolymers; ethylene-propylene-butene ter-polymers; and ethylene-alkyl acrylate-maleic anhydride ter-polymers.

6. The thermoformable sheet of claim 1 wherein the gas barrier layer comprises a polymer selected from the group consisting of ethylene-vinyl alcohol copolymers (EVOH), vinylidene chloride copolymers (PVDC), polyamides, and blends of one or more EVOH and one or more polyamides.

7. The thermoformable sheet of claim 6 wherein the gas barrier layer is bonded to said foam polypropylene layers by means of tie layers of modified polyolefins.

8. The thermoformable sheet of claim 1, wherein said sheet has a density rang from about 0.50 to about 0.85 g/cm³ and a flexural modulus higher than 400 MPa.

9. A thermoformed article obtained from a sheet according to claim 1.

* * * * *